United States Patent
Toma et al.

(10) Patent No.: US 10,112,552 B2
(45) Date of Patent: Oct. 30, 2018

(54) VEHICLE VISION SYSTEM WITH CAMERA VIEWING THROUGH WINDSHIELD

(71) Applicant: MAGNA ELECTRONICS INC., Auburn Hills, MI (US)

(72) Inventors: Tom Toma, Waterford, MI (US); Alan M. Cordeiro, Farmington Hills, MI (US); Ove J. Salomonsson, Farmington Hills, MI (US); Garret F. Achenbach, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 278 days.

(21) Appl. No.: 15/062,525

(22) Filed: Mar. 7, 2016

(65) Prior Publication Data

US 2016/0264063 A1 Sep. 15, 2016

Related U.S. Application Data

(60) Provisional application No. 62/131,517, filed on Mar. 11, 2015.

(51) Int. Cl.
*B60R 11/04* (2006.01)
*G06K 9/00* (2006.01)
*G06K 9/20* (2006.01)
*B60R 11/00* (2006.01)

(52) U.S. Cl.
CPC .......... *B60R 11/04* (2013.01); *G06K 9/00791* (2013.01); *G06K 9/209* (2013.01); *B60R 2011/0026* (2013.01); *G06K 9/00362* (2013.01)

(58) Field of Classification Search
CPC ............ B60R 11/04; B60R 2011/0026; G06K 9/00791; G06K 9/00362; G06K 9/209
See application file for complete search history.

(56) References Cited

U.S. PATENT DOCUMENTS

| | | |
|---|---|---|
| 5,096,287 A | 3/1992 | Kakinami et al. |
| 5,130,804 A | 7/1992 | Tamura |
| 5,550,677 A | 8/1996 | Schofield et al. |
| 5,670,935 A | 9/1997 | Schofield et al. |
| 5,796,094 A | 8/1998 | Schofield et al. |
| 5,877,897 A | 3/1999 | Schofield et al. |
| 5,920,061 A | 7/1999 | Feng |
| 5,949,331 A | 9/1999 | Schofield et al. |

(Continued)

*Primary Examiner* — Zhihan Zhou
(74) *Attorney, Agent, or Firm* — Honigman Miller Schwartz and Cohn, LLP

(57) ABSTRACT

A vision system of a vehicle includes a camera disposed at a vehicle windshield and viewing through the windshield and exterior of the vehicle. A light-absorbing hiding layer is established at the windshield at an area at which the camera is disposed and includes an portion established therethrough, with the portion aligned with the camera such that the camera views through the windshield via the portion. The portion comprises a wider central region and narrower upper and lower regions. The wider central region of the portion provides a wide angle field of view of the camera at a region ahead of the vehicle and the narrower lower region of the portion reduces the field of view at regions near to and sidewards from the front of the vehicle. An image processor is operable to process image data captured by the camera for a machine vision function or driver assistance system.

20 Claims, 11 Drawing Sheets

(56) References Cited

U.S. PATENT DOCUMENTS

| | | | |
|---|---|---|---|
| 6,087,953 A | 7/2000 | DeLine et al. | |
| 6,124,886 A | 9/2000 | DeLine et al. | |
| 6,172,613 B1 | 1/2001 | DeLine et al. | |
| 6,243,003 B1 | 6/2001 | DeLine et al. | |
| 6,250,148 B1 | 6/2001 | Lynam | |
| 6,278,377 B1 | 8/2001 | DeLine et al. | |
| 6,326,613 B1 | 12/2001 | Heslin et al. | |
| 6,329,925 B1 | 12/2001 | Skiver et al. | |
| 6,420,975 B1 | 7/2002 | DeLine et al. | |
| 6,428,172 B1 | 8/2002 | Hutzel et al. | |
| 6,445,287 B1 | 9/2002 | Schofield et al. | |
| 6,466,136 B2 | 10/2002 | DeLine | |
| 6,501,387 B2 | 12/2002 | Skiver et al. | |
| 6,690,268 B2 | 2/2004 | Schofield et al. | |
| 6,824,281 B2 | 11/2004 | Schofield et al. | |
| 7,004,593 B2 | 2/2006 | Weller et al. | |
| 7,038,577 B2 | 5/2006 | Pawlicki et al. | |
| 7,095,572 B2 | 8/2006 | Lee et al. | |
| 7,215,479 B1 | 5/2007 | Bakin | |
| 7,262,406 B2 | 8/2007 | Heslin et al. | |
| 7,265,342 B2 | 9/2007 | Heslin et al. | |
| 7,289,037 B2 | 10/2007 | Uken et al. | |
| 7,420,159 B2 | 9/2008 | Heslin et al. | |
| 7,480,149 B2 | 1/2009 | DeWard et al. | |
| 7,533,998 B2 | 5/2009 | Schofield et al. | |
| 7,538,316 B2 | 5/2009 | Heslin et al. | |
| 7,551,103 B2 | 6/2009 | Schofield | |
| 7,720,580 B2 | 5/2010 | Higgins-Luthman | |
| 7,855,755 B2 | 12/2010 | Weller et al. | |
| 7,916,009 B2 | 3/2011 | Schofield et al. | |
| 7,918,570 B2 | 4/2011 | Weller et al. | |
| 8,063,759 B2 | 11/2011 | Bos et al. | |
| 8,179,437 B2 | 5/2012 | Schofield et al. | |
| 8,223,203 B2 | 7/2012 | Ohsumi et al. | |
| 8,254,011 B2 | 8/2012 | Baur et al. | |
| 8,256,821 B2 | 9/2012 | Lawlor et al. | |
| 8,339,453 B2 | 12/2012 | Blake, III et al. | |
| 8,405,726 B2 | 3/2013 | Schofield et al. | |
| 8,451,332 B2 | 5/2013 | Rawlings | |
| 8,513,590 B2 | 8/2013 | Heslin et al. | |
| 8,531,278 B2 | 9/2013 | DeWard et al. | |
| 8,534,887 B2 | 9/2013 | DeLine | |
| 8,542,451 B2 | 9/2013 | Lu et al. | |
| 8,743,203 B2 | 6/2014 | Karner | |
| 8,851,690 B2 | 10/2014 | Uken | |
| 9,090,213 B2 | 7/2015 | Lawlor et al. | |
| 9,150,165 B1 | 10/2015 | Fortin | |
| 9,156,403 B2 | 10/2015 | Rawlings | |
| 9,277,104 B2 | 3/2016 | Sesti et al. | |
| 9,451,138 B2 | 9/2016 | Winden et al. | |
| 9,487,159 B2 | 11/2016 | Achenbach | |
| 9,596,387 B2 | 3/2017 | Achenbach et al. | |
| 9,871,971 B2 | 1/2018 | Wang et al. | |
| 2002/0003571 A1 | 1/2002 | Schofield | |
| 2003/0169522 A1 | 9/2003 | Schofield et al. | |
| 2004/0189862 A1 | 9/2004 | Gustavsson et al. | |
| 2005/0141106 A1 | 6/2005 | Lee et al. | |
| 2006/0050018 A1 | 3/2006 | Hutzel et al. | |
| 2006/0061008 A1 | 3/2006 | Karner | |
| 2006/0077575 A1 | 4/2006 | Nakai et al. | |
| 2006/0103727 A1 | 5/2006 | Tseng | |
| 2007/0109406 A1 | 5/2007 | Schofield et al. | |
| 2007/0120657 A1 | 5/2007 | Schofield et al. | |
| 2007/0171037 A1* | 7/2007 | Schofield | B60C 23/00 340/438 |
| 2007/0221826 A1 | 9/2007 | Bechtel | |
| 2008/0247751 A1 | 10/2008 | Lang et al. | |
| 2008/0252882 A1 | 10/2008 | Kesterson | |
| 2009/0295181 A1* | 12/2009 | Lawlor | B60R 1/12 296/1.11 |
| 2010/0110192 A1 | 5/2010 | Johnston et al. | |
| 2010/0134616 A1 | 6/2010 | Seger et al. | |
| 2010/0165468 A1 | 7/2010 | Yamada et al. | |
| 2010/0172542 A1* | 7/2010 | Stein | G06K 9/00798 382/103 |
| 2010/0279439 A1 | 11/2010 | Shah et al. | |
| 2011/0025850 A1 | 2/2011 | Maekawa et al. | |
| 2012/0008129 A1 | 1/2012 | Lu et al. | |
| 2012/0013741 A1 | 1/2012 | Blake, III et al. | |
| 2012/0081550 A1 | 4/2012 | Sewell | |
| 2012/0105641 A1* | 5/2012 | Schofield | B60C 23/0401 348/148 |
| 2012/0265416 A1 | 10/2012 | Lu et al. | |
| 2012/0310519 A1* | 12/2012 | Lawlor | B60R 1/12 701/301 |
| 2013/0002873 A1 | 1/2013 | Hess | |
| 2013/0037589 A1* | 2/2013 | Heslin | B60R 1/04 224/482 |
| 2013/0141579 A1* | 6/2013 | Schofield | B60C 23/0401 348/148 |
| 2013/0144488 A1* | 6/2013 | Schofield | B60C 23/0401 701/36 |
| 2014/0043465 A1* | 2/2014 | Salomonsson | B60R 1/00 348/113 |
| 2014/0160284 A1 | 6/2014 | Achenbach et al. | |
| 2014/0226012 A1 | 8/2014 | Achenbach et al. | |
| 2014/0241589 A1* | 8/2014 | Weber | G06K 9/00791 382/108 |
| 2014/0320946 A1* | 10/2014 | Tomkins | B60J 3/04 359/275 |
| 2015/0015713 A1 | 1/2015 | Wang | |
| 2015/0251605 A1 | 9/2015 | Uken et al. | |
| 2015/0329063 A1 | 11/2015 | Lawlor et al. | |

\* cited by examiner

VEHICLE VISION SYSTEM WITH CAMERA VIEWING THROUGH WINDSHIELD

CROSS REFERENCE TO RELATED APPLICATION

The present application claims the filing benefits of U.S. provisional application Ser. No. 62/131,517, filed Mar. 11, 2015, which is hereby incorporated herein by reference in its entirety.

FIELD OF THE INVENTION

The present invention relates generally to a vehicle vision system for a vehicle and, more particularly, to a vehicle vision system that utilizes a forward viewing camera at a windshield of a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Packaging of forward facing imagers is also known, such as described in U.S. Pat. Nos. 7,262,406; 7,265,342; 7,420,159; 7,480,149; 7,533,998; 7,538,316; 7,916,009; 8,179,437 and/or 8,405,726, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle. The system includes a forward viewing camera disposed behind and viewing through the windshield of the vehicle, with the windshield having a light-absorbing blackout area or hiding layer established thereat to limit viewability of the camera to a person viewing the vehicle windshield from outside the vehicle. The system of the present invention provides a customized or selected light-transmitting aperture through the hiding layer at the windshield to provide a desired field of view of the camera through the windshield via the light-absorbing aperture while limiting or reducing viewability of the camera to a person viewing the vehicle windshield from outside the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes a control having an image processor that is operable to process image data captured by one or more cameras and/or provide an output to a display device for displaying images representative of the captured image data.

Figure 1:
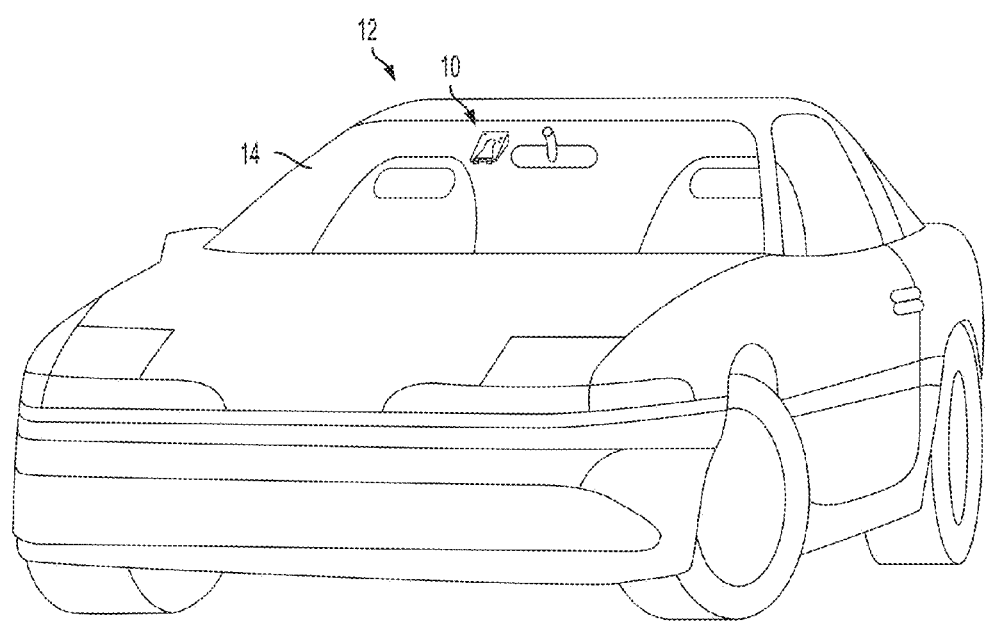
FIG. 1 is a plan view of a vehicle with a vision system that incorporates a forward viewing camera in accordance with the present invention.

A vehicular camera system or module can be installed on the inside of the front windshield of a vehicle, such as a car, truck, bus, or van. Such a camera system may be used for a variety of functions such as an object detection function, a lane keeping function, and an exterior light or high beam control function or the like. FIG. 1 shows an example of a vehicular camera system or module 10 configured to be attached in a front-facing manner to a vehicle 12, such as at a windshield 14 of a vehicle 12. The camera or camera module is disposed at a bracket or structure attached at the interior surface of the windshield at and behind a blackout area or darkening or hiding layer (such as a ceramic frit layer) of the windshield, such that the module and bracket are generally not readily viewable to a person viewing the windshield from outside of the vehicle. The opaque or light absorbing or non-light-transmitting layer (such as an opaque ceramic frit layer or the like) is established or disposed at the area of the windshield at which a windshield attachment member is mounted, with a light-transmitting portion or void or aperture established through the opaque layer generally at the area in front of and generally aligned with the imager and lens of the camera module when the camera module is mounted at the windshield attachment member at the windshield (and optionally with the same aperture or a second aperture also aligned with any rain sensor used, so that the camera and the rain sensor can view through the windshield through the aperture or apertures formed through the opaque frit layer). The frit layer or light-absorbing layer may extend across windshield or may be locally established where camera and interior mirror assembly are located at the windshield. The frit layer and light-transmitting portion or aperture therethrough may utilize aspects of the vision systems described in U.S. Pat. Nos. 7,480,149; 6,824,281 and/or 6,326,613, which are hereby incorporated herein by reference in their entireties.

The hiding layer or blackout layer or area thus includes a void or aperture or light-transmitting portion or region in front of and aligned with the forward viewing camera, such that the camera views through the windshield at the aperture and forward of the vehicle. The light-transmitting portion or void or aperture is sized and shaped to reduce or minimize the footprint or profile of the aperture (to limit or reduce or minimize the viewability of the camera to a person outside the vehicle), while providing a sufficient or desired field of view of the camera through the windshield and forward of the vehicle, as discussed below.

The imaging system or vision system that includes the forward viewing camera 10 may also include or be associated with at least one other exterior facing imaging sensor or camera, such as a rearward facing imaging sensor or camera (and the system may optionally include multiple exterior facing imaging sensors or cameras, such as the forwardly facing camera at the front (or at the windshield) of the vehicle, and a sidewardly/rearwardly facing camera at respective sides of the vehicle), which captures images exterior of the vehicle, with the camera having a lens for focusing images at or onto an imaging array or imaging plane or imager of the camera. The vision system includes a control or electronic control unit (ECU) or processor that is operable to process image data captured by the cameras and may provide displayed images at a display device for viewing by the driver of the vehicle. The data transfer or signal communication from the camera to the ECU may comprise any suitable data or communication link, such as a vehicle network bus or the like of the equipped vehicle.

The camera system or camera module of the present invention may utilize aspects of the systems and/or modules described in International Publication Nos. WO 2013/123161 and/or WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Pat. Publication No. US-2009-0295181, and/or U.S. Publication Nos. US-2015-0251605 and/or US-2014-0226012, which are all hereby incorporated herein by reference in their entireties. Optionally, and desirably, the camera utilizes aspects of the cameras described in U.S. Publication No. US-2014-0160284, which is hereby incorporated herein by reference in its entirety.

The camera module may attach at a camera mounting bracket via any suitable means, and may detachably attach so that the camera module may be detached for service or replacement while the bracket remains attached at the windshield surface. The camera bracket may be adhesively attached at the in-cabin surface of the vehicle windshield, such as at the light-absorbing layer at an upper central region of the windshield at or near or spaced from where a mirror mounting button (to which an interior rearview mirror assembly may attach) is adhesively attached at the in-cabin surface of the vehicle windshield. Optionally, a stray light shield or shroud is attached (such as via a plurality of fasteners, such as screws or the like) at the camera module and/or camera mounting bracket at the camera lens barrel. When the camera module is mounted at the bracket or structure that is attached at the windshield of the vehicle, the stray light shield or shroud is disposed generally at the in-cabin surface of the windshield so that the camera views through or across the recess established by the shroud and through the windshield, such as through the void or aperture or region of the windshield that is devoid of the blackout area or layer or opaque hiding layer or frit layer or the like.

Figure 2:
FIG. 2 is view of a forward viewing camera through an aperture of a hiding layer at a vehicle windshield.

As shown in FIG. 2, the forward facing camera module of a vision system is placed at the in-cabin surface of a windshield of a vehicle. The camera module (and associated mounting structure or bracket) is disposed behind a hiding layer or blackout area. The aperture or void is established through the blackout area for the sensor or camera to view through the windshield and forward of the vehicle.

Figure 3:
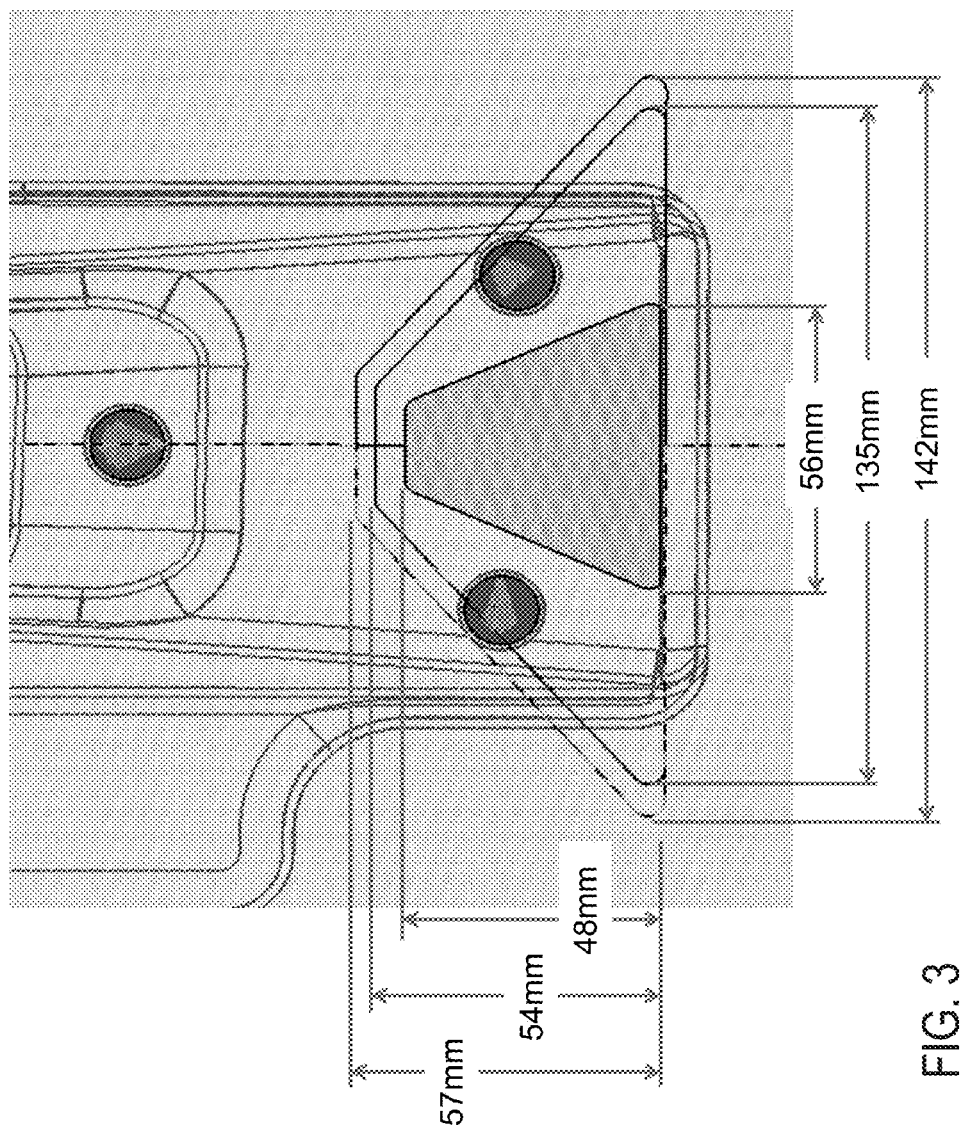
FIG. 3 is a schematic showing the size and shape of a viewing apertures at a camera module.

For wide field of view (FOV) applications, the blackout can be very large and unsightly. For example, and such as shown in FIG. 3, the light-transmitting portion or void or aperture may be at least about twice the width of a shroud or housing portion of the camera (through which the camera lens and imager views), and may have a greater height dimension as compared to the camera housing. In accordance with the present invention, the aperture or void in the "blackout" area for wide FOV applications is reduced and optimized for in-vehicle integration.

In determining the void shape and dimensions, the void design for wide angle field of view applications should consider the use cases for the particular vision system.

For example, the void design (size and shape) should be based on the range of objects that may be detected in the field of view of the camera. An object detected at a specific distance occurs at a specific location in the image, this is generally at the horizon or middle of the image vertically. If an object continues to be of interest for the vehicle control, the position from the center of the sensor to the object may be less than the capability of the optical system as the vehicle approaches the object.

The void design (size and shape) may also or otherwise be determined based on the angle of an object relative to the vehicle camera. An object detected at a specific angle occurs at a specific location in the image, which is generally at the horizon or middle of the image vertically and near the edge. If an object continues to be of interest for the vehicle control, the position from the center of the sensor to the object may be less than the capability of the optical system as the vehicle approaches the object.

The void design (size and shape) may also or otherwise be determined based on the functional content of the sensor and system. For example, the particular size and shape of the void may be determined at least in part on whether the vision system is for providing an emergency braking function, a warning function and/or an object detection function or the like.

The light-transmitting portion or void or aperture through the hiding layer should be sized and shaped taking these considerations into contention. For example, and as can be seen with reference to FIGS. 4 and 5, the void may be cropped at the lower corner regions to reduce the size of the void (and thus enhance the appearance of the windshield to a person viewing the windshield from outside of the vehicle), while allowing a sufficient field of view to the camera to detect an object at a distance ahead of the vehicle (FIG. 4) and when the object (such as, for example, a pedestrian or the like) is closer to the vehicle (FIG. 5). The customized or reduced size void shape is shown in FIG. 6, with the void being shown in relation to a typical generally triangular-shaped void or aperture at a camera.

Figure 7:
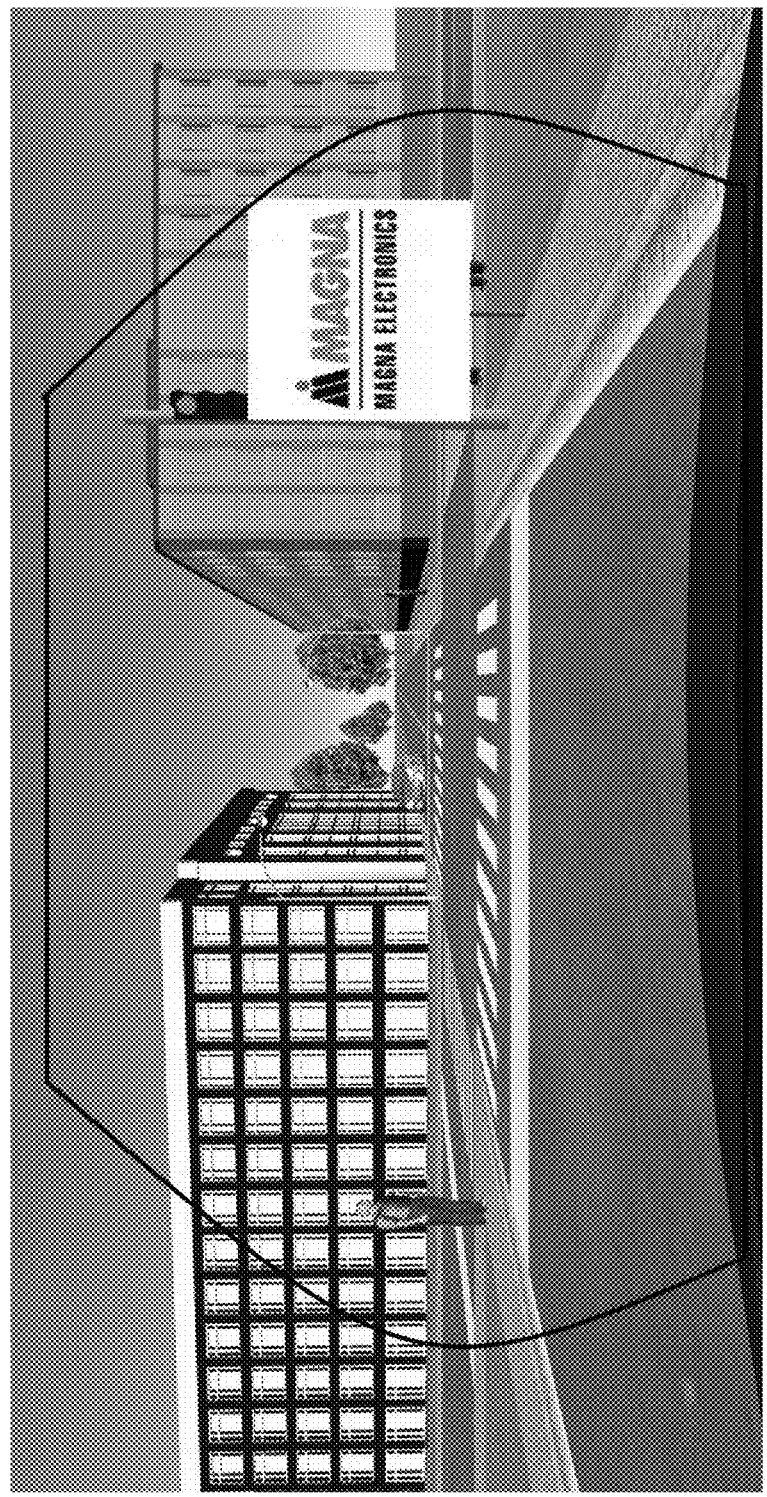
FIG. 7 is another schematic showing an example of the forward field of view of a camera viewing through an aperture of a hiding layer in accordance with the present invention.

Optionally, the void may be provided or established in any shape that provides the desired field of view of the camera for the particular application or applications of the camera and vision system. For example, and such as shown in FIG. 7, the void may have curved or rounded boundaries to provide a wider angle field of view at a selected range of distances ahead of the vehicle and a narrower angle field of view closer to the vehicle and above the horizon, since those areas may be of less interest to the camera and vision system.

Figure 4:
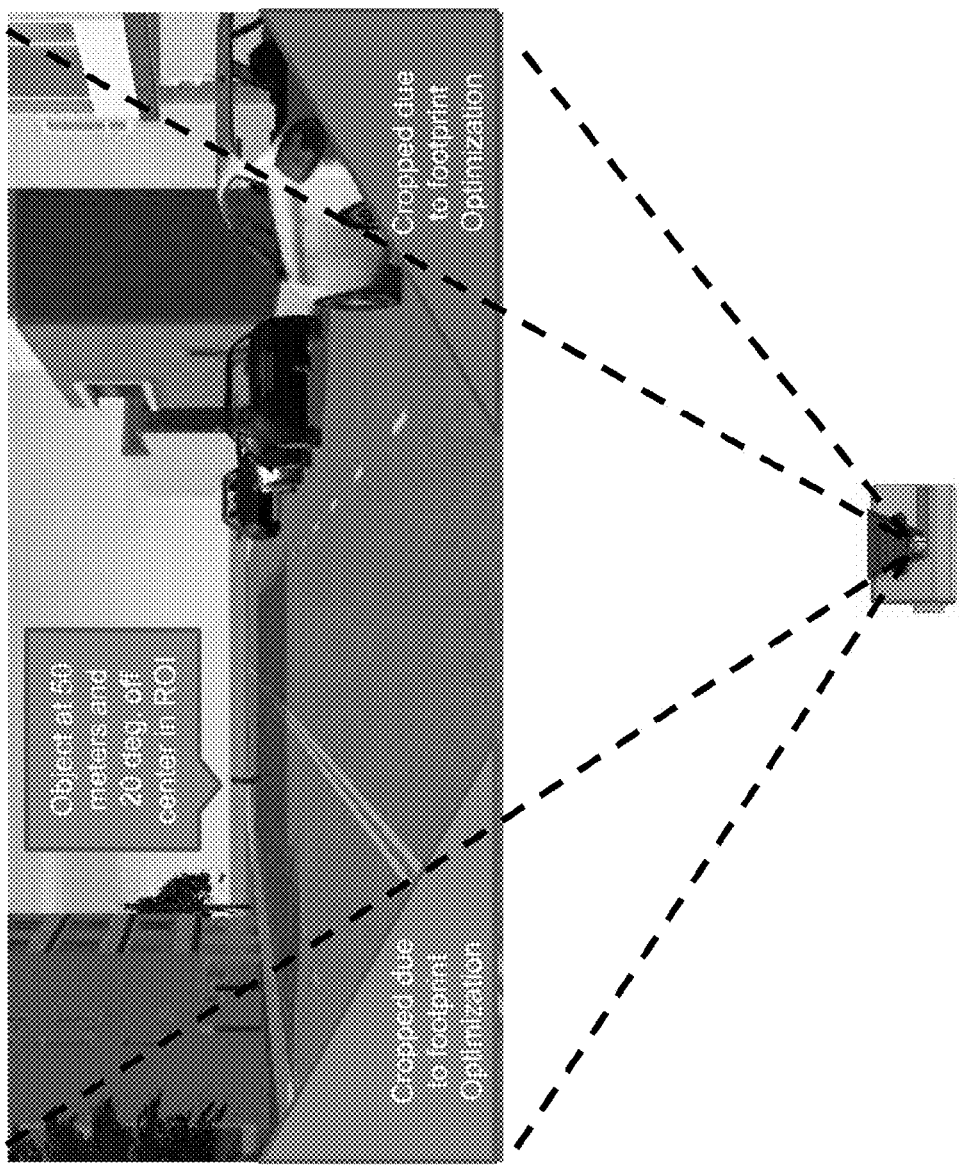
FIG. 4 is a schematic showing an example of the forward field of view of a camera viewing through an aperture of a hiding layer in accordance with the present invention.
Figure 5:
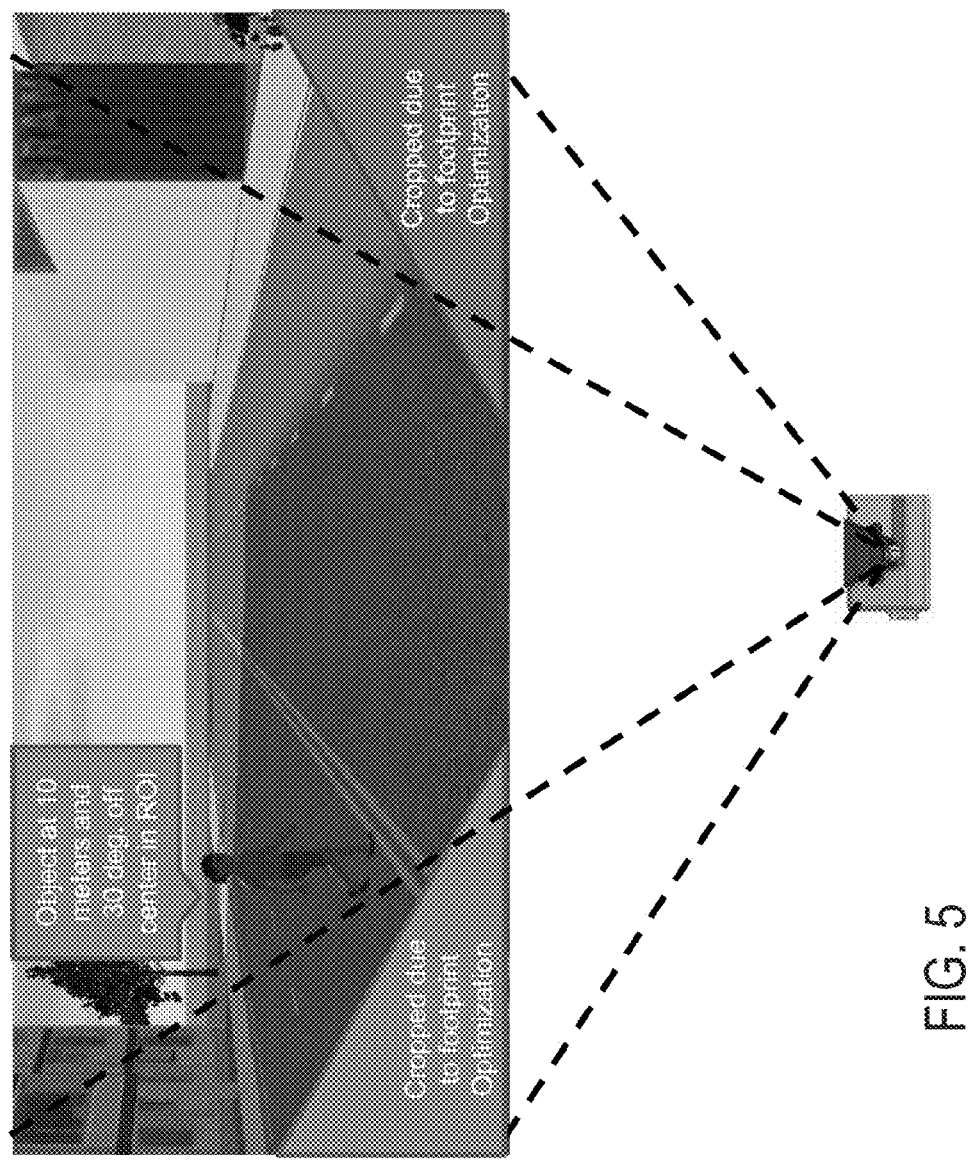
FIG. 5 is another schematic showing an example of the forward field of view of a camera viewing through the aperture of FIG. 4.
Figure 6:
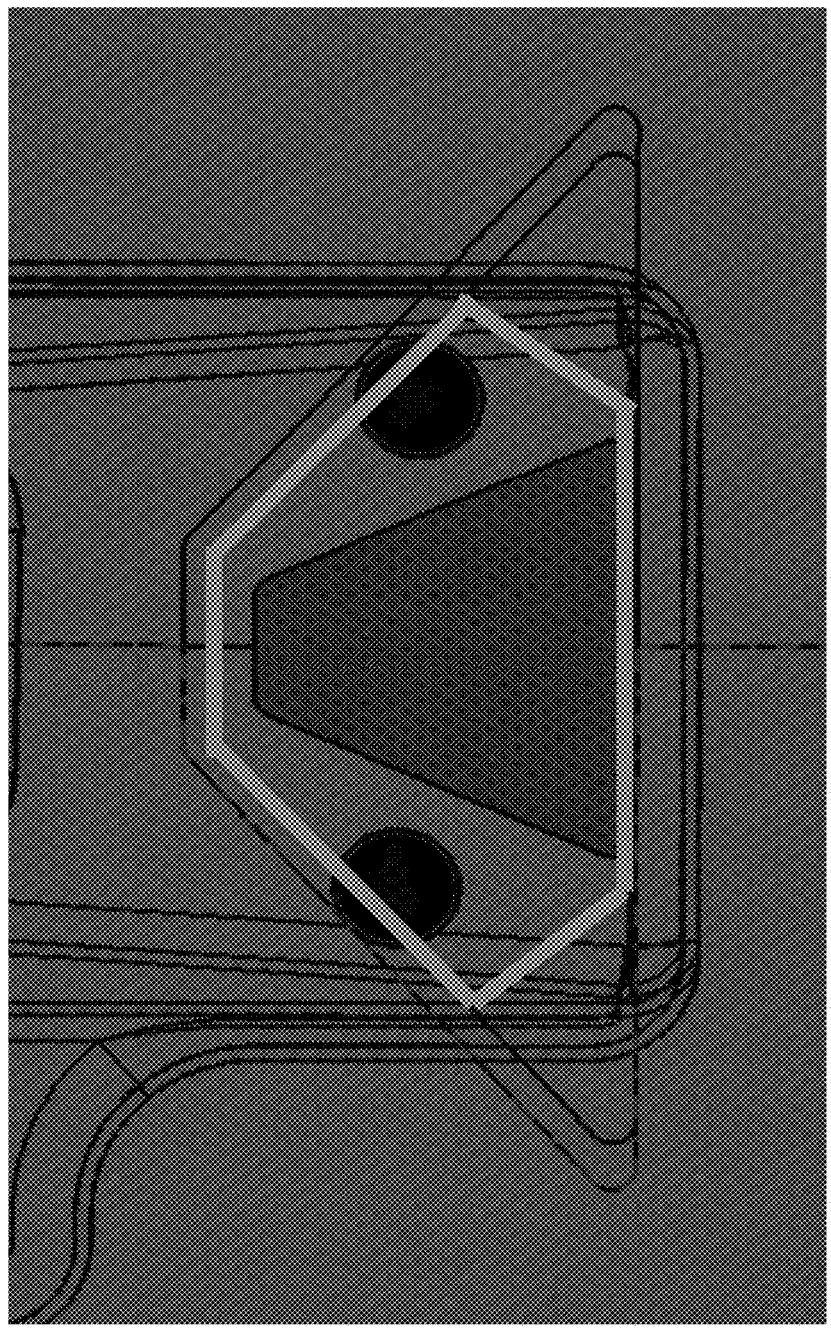
FIG. 6 is a schematic showing a cropped aperture of a hiding layer in accordance with the present invention.

In applications where the camera's field of view may encompass some of the hiding layer due to the smaller sized void or aperture (such as can be seen at the lower inboard corners of the cropped apertures in FIGS. 4 and 5), the image processing of captured image data may be adjusted to ignore (not process) image data captured at those regions to reduce processing requirements of the vision system.

Figure 8:
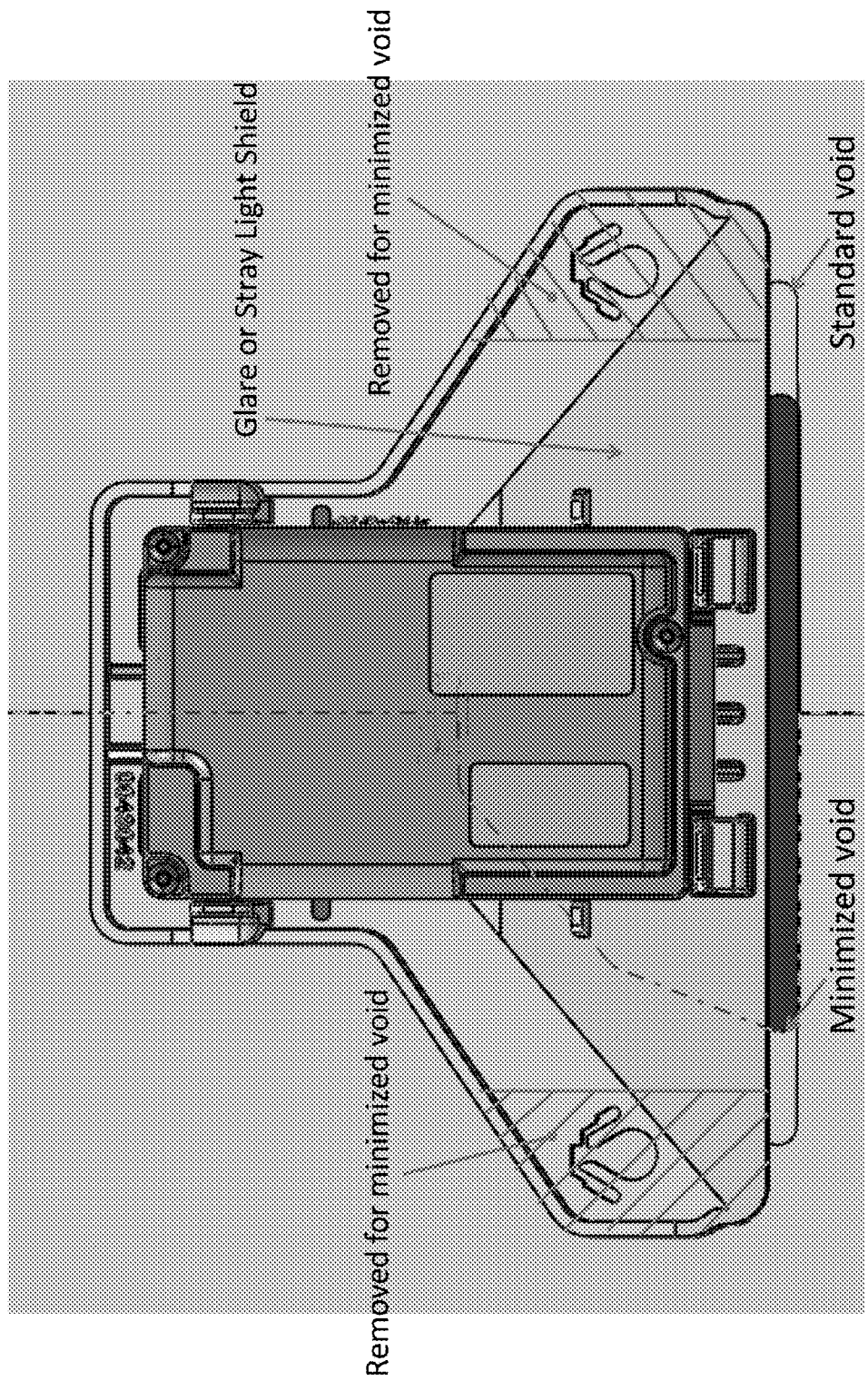
FIG. 8 is a plan view of a camera module with a reduced void that provides for a reduced glare or stray light shield.
Figure 9:
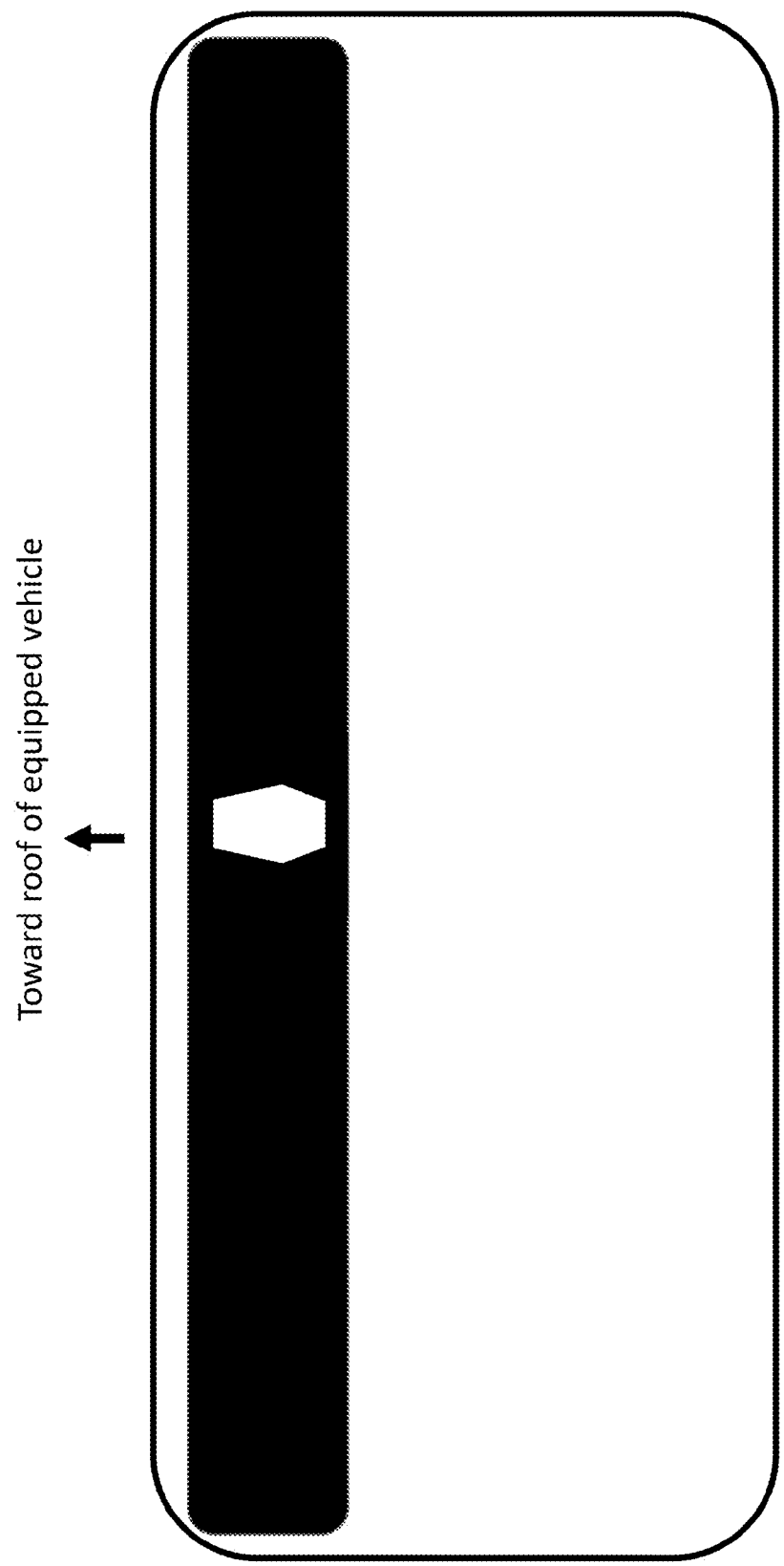
FIG. 9 is a view of a light-absorbing layer across an upper windshield region, shown with a light-transmitting aperture having a shape with a narrower lower region in accordance with the present invention.
Figure 11:
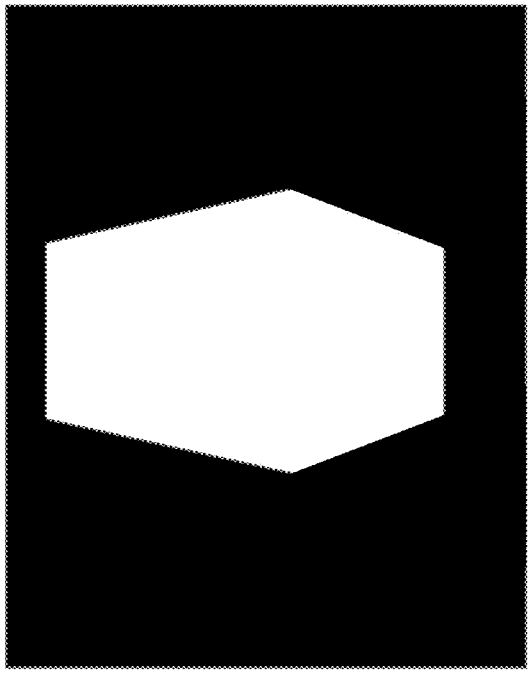
FIG. 11 is an enlarged view of the light-transmitting aperture and light-absorbing layer at the windshield of FIG. 9.

As discussed above, camera module may include a stray light shield or shroud attached at the camera module and/or camera mounting bracket at the camera lens barrel so as to be disposed generally at the in-cabin surface of the windshield so that the camera views through or across the recess established by the shroud and through the windshield, such as through the void or aperture or region of the windshield that is devoid of the blackout area or layer or opaque hiding layer or frit layer or the like. Such a stray light shield or glare shield is also enhanced by the present invention to limit or substantially preclude any dashboard glare from entering the camera. The present invention enhances the black-out void from the "outside looking in", and provides for reduction or minimization of the glare shield mounted underneath the optical path or view of the camera to attenuate or block any reflections from the top of dash board area. These reflections can be caused by the likes of navigation systems or other equipment like phone holders, documents or trash on the dashboard that reflect light up towards the windshield where such reflected light would enter the camera lens without such a glare shield. As shown in FIG. 8, the reduced void of the present invention may include a cover (glare or stray light shield) to block the reflections on the windshield from the vehicle passenger compartment. By making the void thinner, the footprint of the camera module at the windshield can also be thinner. This thinner footprint is more visually appealing for vehicle styling and allows for more road visibility for the driver.

Figure 10:
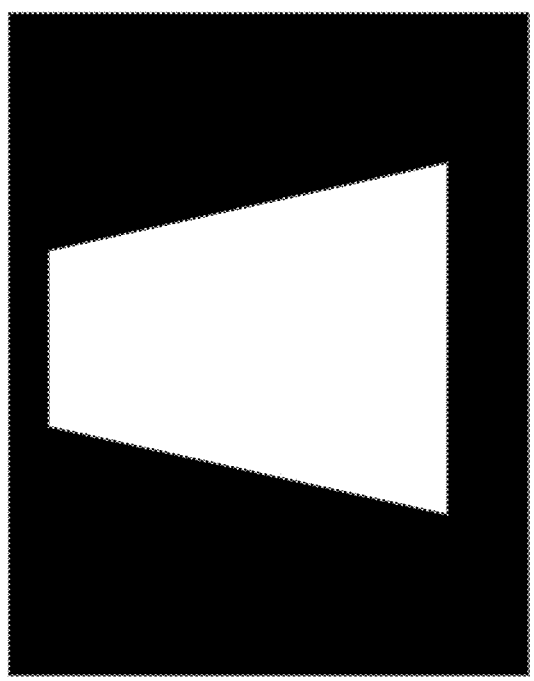
FIG. 10 is a view of a light-absorbing layer at a windshield shown with a light-transmitting aperture having a trapezoidal shape.
Figure 13:
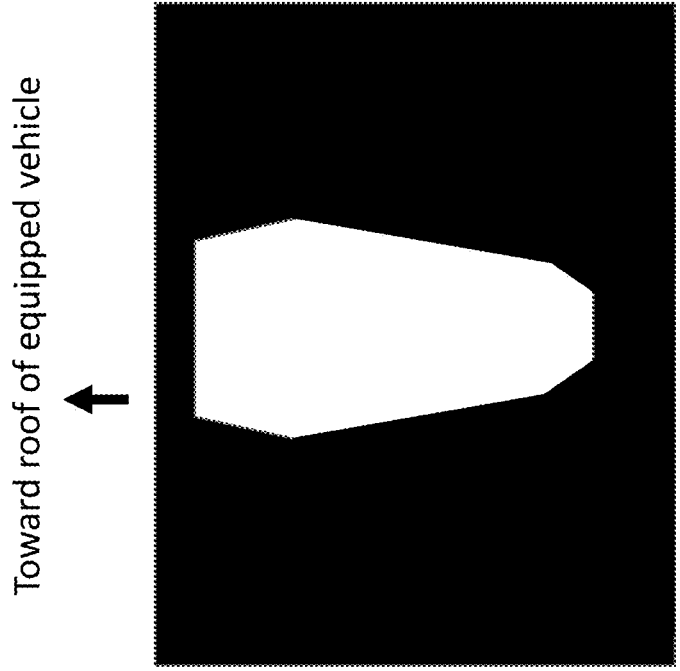
FIG. 13 is a view of a light-absorbing layer at a windshield, shown with another light-transmitting aperture having a shape with a narrower lower region in accordance with the present invention.
Figure 12:
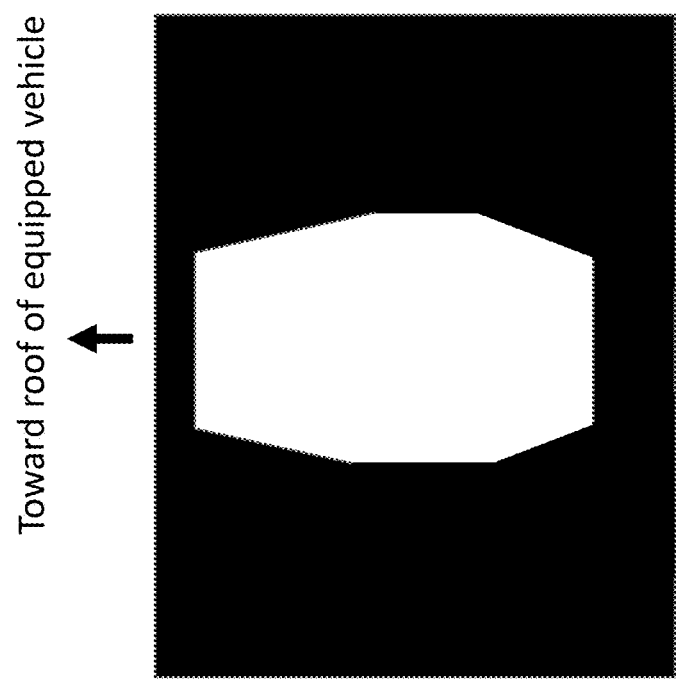
FIG. 12 is a view of a light-absorbing layer at a windshield, shown with another light-transmitting aperture having a shape with a narrower lower region in accordance with the present invention.

As shown in FIGS. 9 and 11-13, the light-transmitting portion or aperture for the camera system of the present invention may be various shapes, with a wider central region and a narrower upper region (narrower than the wider central region) and a narrower lower region (narrower than the wider central region). This is in contrast to a conventional trapezoidal-shaped aperture (FIG. 10). The light-transmitting portion may comprise an aperture bounded by the light-absorbing layer, or may be a light-transmitting portion at a lower region of the light-absorbing layer, where the light-transmitting portion may be bounded by the light-absorbing layer along its top and sides, but not bounded by the light-absorbing layer at its lowermost end or bottom region. The particular configuration or shape of the light-transmitting aperture is selected depending at least in part on the end-use of the camera disposed at and viewing through the aperture. By reducing the width of the aperture at the lower ends or regions and otherwise cropping the field of view of the camera through the aperture, the present invention provides enhanced performance of the vision system since image data captured by the camera at the cropped regions need not be processed by the image processor.

Therefore, the present invention provides a customized or selected size and shape of the void or aperture through a blackout area or hiding layer to provide a desired or appropriate field of view to the forward viewing camera disposed behind the blackout area and viewing through the windshield at the void or aperture. The width of the aperture may be selected to provide a wide angle field of view at the areas where such a wide angle field of view is needed or desired for the camera, and may be narrowed at other regions (such as above and below the wider region) to reduce or minimize the size of the aperture or void, and thus to limit or reduce the viewability of the camera to a person viewing the vehicle and windshield from outside the vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Pat. No. 9,264,672, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
   a camera disposed at a windshield of a vehicle viewing through the windshield and exterior of the vehicle;
   a light-absorbing hiding layer established at part of the windshield at an area at which said camera is disposed;
   wherein said light-absorbing hiding layer has a light-transmitting portion established therethrough and wherein said light-transmitting portion is aligned with a lens and imager of said camera such that said camera views through the windshield via said light-transmitting portion;
   wherein said light-transmitting portion comprises a wider central region, a narrower upper region above said wider central region, and a narrower lower region below said wider central region, and wherein said narrower upper region has a width that is narrower than a width of said wider central region, and wherein said narrower lower region has a width that is narrower than the width of said wider central region, and wherein said wider central region of said light-transmitting portion provides a wide angle field of view through the windshield for said camera at a region ahead of the vehicle, and wherein said narrower lower region of said light-transmitting portion reduces the field of view through the windshield for said camera at regions near to and sidewards from the front of the vehicle; and
   an image processor operable to process image data captured by said camera for at least one of (i) an object detection function, (ii) a lane marker detection function, (iii) an emergency braking function and (iv) a warning function.

2. The vision system of claim 1, wherein the shape of said light-transmitting portion is determined at least in part responsive to the particular function of said image processor and said vision system.

3. The vision system of claim 1, wherein said camera comprises a stray light shield configured to limit light emanating from an interior portion of the vehicle from entering a lens of said camera.

4. The vision system of claim 1, wherein said camera comprising a camera module, and wherein a lens and imager of said camera module are disposed at a camera housing that is configured to attach at an in-cabin surface of the windshield so that said lens and said imager view through the windshield via said light-transmitting portion.

5. The vision system of claim 4, wherein said camera module comprises a stray light shield disposed generally in front of said lens of said camera module so that said lens views through a recess established by said stray light shield and through the windshield via said light-transmitting portion.

6. The vision system of claim 1, wherein the width of said narrower upper region of said light-transmitting portion is the same as the width of said narrower lower region.

7. The vision system of claim 1, wherein the width of said narrower upper region of said light-transmitting portion is less than the width of said narrower lower region.

8. The vision system of claim 1, wherein the width of said narrower upper region of said light-transmitting portion is greater than the width of said narrower lower region.

9. The vision system of claim 1, wherein said light-transmitting portion is shaped with curved sides.

10. The vision system of claim 1, wherein said camera is mounted at a mounting bracket that is attached at an in-cabin surface of the windshield.

11. The vision system of claim 10, wherein said mounting bracket is adhesively attached at the in-cabin surface of the windshield.

12. The vision system of claim 11, wherein said mounting bracket is adhesively attached at said light-absorbing hiding layer.

13. The vision system of claim 1, wherein said camera comprises a camera module adhesively attached at an in-cabin surface of the windshield.

14. A vision system of a vehicle, said vision system comprising:
- a camera module disposed at a windshield of a vehicle, wherein said camera module comprises an imager and a lens and a camera housing, and wherein said imager and said lens are disposed at said camera housing such that, when said camera module is disposed at the windshield of the vehicle, said imager views through the windshield and exterior of the vehicle;
- wherein said camera module comprises a stray light shield disposed generally in front of said lens so that said imager views through a recess established by said stray light shield, and wherein said stray light shield is configured to limit light emanating from an interior portion of the vehicle from entering said lens of said camera module;
- a light-absorbing hiding layer established at part of the windshield at an area at which said camera module is disposed;
- wherein said light-absorbing hiding layer has a light-transmitting portion established therethrough and wherein said light-transmitting portion is aligned with said lens and imager of said camera module such that said imager views through the windshield via said light-transmitting portion;
- wherein said light-transmitting portion comprises a wider central region, a narrower upper region above said wider central region, and a narrower lower region below said wider central region, and wherein said narrower upper region has a width that is narrower than a width of said wider central region, and wherein said narrower lower region has a width that is narrower than the width of said wider central region, and wherein said wider central region of said light-transmitting portion provides a wide angle field of view through the windshield for said imager of said camera module at a region ahead of the vehicle, and wherein said narrower lower region of said light-transmitting portion reduces the field of view through the windshield for said imager at regions near to and sidewards from the front of the vehicle;
- wherein the width of said narrower upper region of said light-transmitting portion is one of (ii) less than the width of said narrower lower region and (iii) greater than the width of said narrower lower region; and
- an image processor operable to process image data captured by said imager of said camera module for at least one of (i) an object detection function, (ii) a lane marker detection function, (iii) an emergency braking function and (iv) a warning function.

15. The vision system of claim 14, wherein the shape of said light-transmitting portion is determined at least in part responsive to the particular function of said image processor and said vision system.

16. The vision system of claim 14, wherein said light-transmitting portion is shaped with curved sides.

17. The vision system of claim 14, wherein said camera module is mounted at a mounting bracket that is adhesively attached at an in-cabin surface of the windshield.

18. A vision system of a vehicle, said vision system comprising:
- a camera module disposed at a windshield of a vehicle, wherein said camera module comprises an imager and a lens and a camera housing, and wherein said imager and said lens are disposed at said camera housing such that, when said camera module is disposed at the windshield of the vehicle, said imager views through the windshield and exterior of the vehicle;
- a light-absorbing hiding layer established at part of the windshield at an area at which said camera module is disposed;
- wherein said light-absorbing hiding layer has a light-transmitting portion established therethrough and wherein said light-transmitting portion is aligned with said lens and said imager of said camera module such that said imager views through the windshield via said light-transmitting portion;
- wherein said light-transmitting portion comprises a wider central region, a narrower upper region above said wider central region, and a narrower lower region below said wider central region, and wherein said narrower upper region has a width that is narrower than a width of said wider central region, and wherein said narrower lower region has a width that is narrower than the width of said wider central region, and wherein said wider central region of said light-transmitting portion provides a wide angle field of view through the windshield for said imager of said camera module at a region ahead of the vehicle, and wherein said narrower lower region of said light-transmitting portion reduces the field of view through the windshield for said imager at regions near to and sidewards from the front of the vehicle;
- wherein said light-transmitting portion is shaped so as to have curved sides between said narrower upper region and said narrower lower region; and
- an image processor operable to process image data captured by said imager of said camera module for at least one of (i) an object detection function, (ii) a lane marker detection function, (iii) an emergency braking function and (iv) a warning function, wherein the shape of said light-transmitting portion is determined at least in part responsive to the particular function of said image processor and said vision system.

19. The vision system of claim 18, wherein said camera module comprises a stray light shield configured to limit light emanating from an interior portion of the vehicle from entering said lens of said camera module, and wherein said stray light shield is disposed generally in front of said lens of said camera module so that said lens views through a recess established by said stray light shield and through the windshield via said light-transmitting portion.

20. The vision system of claim 18, wherein said camera module is mounted at a mounting bracket that is adhesively attached at said light-absorbing hiding layer at an in-cabin surface of the windshield.

* * * * *